United States Patent [19]

Nothdurft

[11] 4,122,586
[45] Oct. 31, 1978

[54] PIPE CLAMP SADDLE

[76] Inventor: Carl Nothdurft, 22412 Lavon, St. Clair Shores, Mich. 48084

[21] Appl. No.: 706,757

[22] Filed: Jul. 19, 1976

[51] Int. Cl.² .................. B65D 63/00; F16L 3/10
[52] U.S. Cl. .................. 24/277; 113/116 HH; 29/457; 29/463
[58] Field of Search .................. 24/276, 277; 113/116 HH, 116 W; 228/173 A, 173 B, 173 C; 72/379; 29/457, 463, 200 B

[56] References Cited

U.S. PATENT DOCUMENTS

| 2,719,345 | 10/1955 | Riker | 24/277 |
|---|---|---|---|
| 3,729,782 | 5/1973 | Downing | 24/277 |
| 3,772,745 | 11/1973 | Dowling et al. | 24/277 |
| 3,955,250 | 5/1976 | Heckethorn | 24/277 |

Primary Examiner—Wayne L. Shedd
Attorney, Agent, or Firm—William L. Fisher

[57] ABSTRACT

U-bolt clamp saddle for pipe joints, such as automobile exhaust pipes, is formed from a stamped sheet metal blank. The saddle includes two mirror-image halves integrally joined and folded along their "bottom" edge. Symmetrical deformations forming the U-bolt sleeves and rigidifying the blank are provided. The sleeves are hexagonal in cross-section. The halves are spot-welded face-to-face after folding.

1 Claim, 6 Drawing Figures

U.S. Patent  Oct. 31, 1978  4,122,586
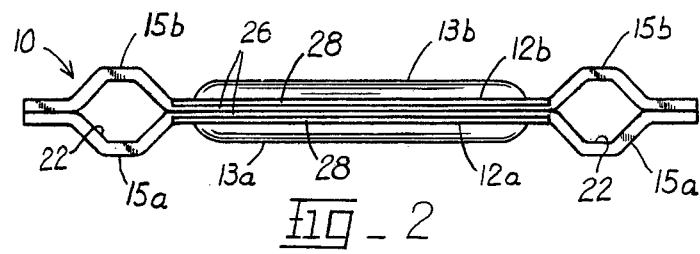
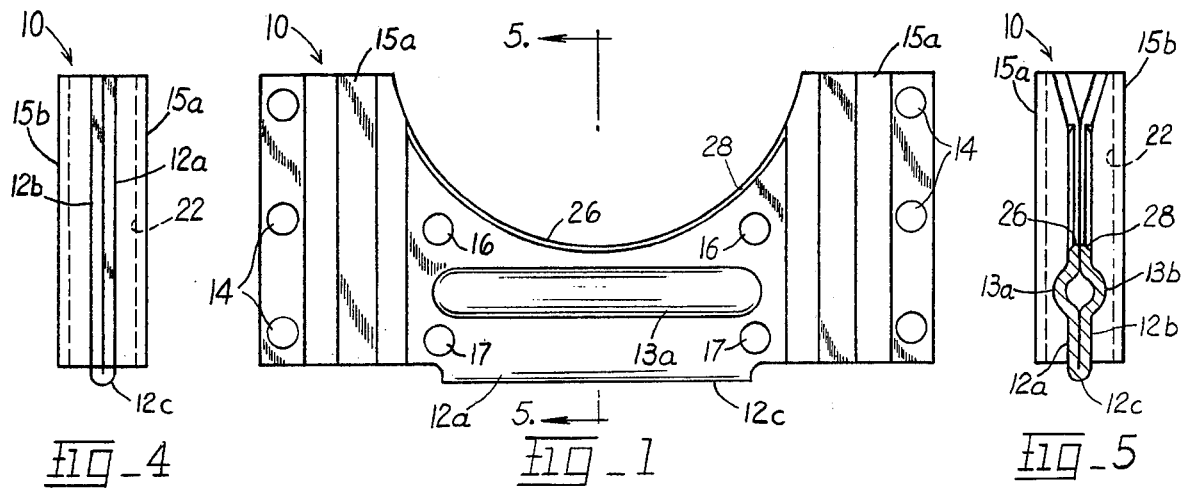
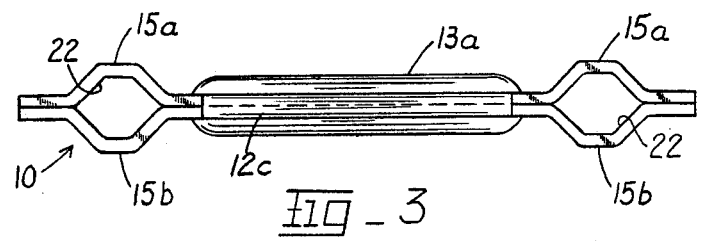
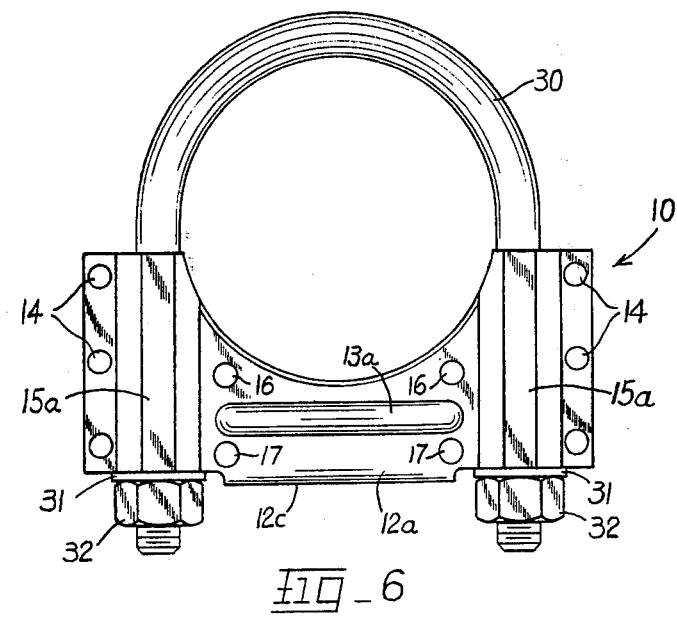

PIPE CLAMP SADDLE

My invention relates to improvements in pipe clamp devices for vehicle exhaust systems. U.S. Pat. No. 3,772,745 to Dowling, et al. shows such a pipe clamp device but the same is not strong enough for use on truck muffler systems as it bends and presently is not being used so far as it is known to applicant. I have invented a stronger pipe clamp device than that shown in said patent. These devices must be as strong as possible to effect a clamp on two heavy-walled pipes which is forceful enough to crimp them so that they do not come apart from expansion at high heat or leak exhaust gases.

The principal object of my invention is the provision of improvements in pipe clamp devices which make them as strong as possible consistent with cost limitations for a mass production item.

FIGS. 1-4 are, respectively, front elevational, top and bottom plan and end elevational views of an improved pipe clamp device embodying my invention;

FIG. 5 is a vertical sectional view of the structure of FIG. 1 taken on the line 5—5 thereof; and FIG. 6 is an assembly view of a complete pipe clamp using the device shown in FIGS. 1-5.

Referring to the drawings in greater detail, said pipe clamp device is generally designated 10 and comprises two integral body portions 12a and 12b which are joined together along a joining line 12c and bent and folded together along said joining line 12c to form two spaced apart tunnel portions 22 and face to face contacting portions. Said face contacting portions consist of a web between said tunnel portions and opposite ends outboard thereof. Said opposite ends are spot welded, as at 14, and said web is spot welded at the four corners thereof, as at 16 and 17, to assist in resisting bending of said device 10. Said fold 12c serves as a strengthening fold since it also imparts resistance to bending of said web. The reason for this is that said fold 12c spans the plane of contact between the contacting faces of said web and is integral with both body portions 12a and 12b. Said web has a rib formed therein by two mating depressions 13a and 13b stamped in said body portions 12a and 12b, respectively. Said rib 13a, 13b extends lengthwise of said web and serves as a strengthening means since it assists the fold 12c in resisting bending of said device 10 when subjected to high torque on the nuts 32. The rib 13a, 13b is straight so that said spot welds 16 and 17 can be formed both above and below the same. The strengthening rib 13a, 13b and the strengthening fold 12c together with the spot welds 14, 16 and 17 impart great strength to said web to resist the bending stresses developed from nut torque applied to said device 10 when being clamped to a pipe joint. Said tunnel portions 22 are formed by two mating pairs of tubular depressions 15a and 15b stamped in said body portions 12a and 12b, respectively. As shown in FIG. 6 said tunnel portions 22 accommodate the legs of a U-bolt 30, the free ends of which legs are threaded for receiving nuts 32 and lock washers 31.

Said device 10 and the U-bolt 30 form a heavy duty pipe clamp for pipe joints for vehicle exhaust systems, particularly trucks. Said tunnel portions 22 are hexagonal in cross-section to provide axial bends which impart to said tunnel portions 22 greater columnar strength against bending. Said hexagonal cross-sections also better resist the nut torque applied to the device 10 since they better mate with the hexagonal nuts 32. Said device 10 has an arcuate top edge to complement the bend in said U-bolt 30 for forming an adjustable circular cavity in said clamp. The center portion of said top edge forms a crimping edge consisting of chamfers 26 and a flat 28. Said biting edge 26, 28 exerts a crimping force on the pipe joint to which the device 10 is applied. Said crimping force must be strong enough to crimp both walls of the two pipes forming said pipe joint and the flat 28 and chamfers 26 facilitate such crimping.

It will thus be seen that there has been provided by my invention an improved pipe clamp device in which the object hereinabove set forth, together with many thoroughly practical advantages, has been successfully achieved. While a preferred embodiment of my invention has been shown and described it is to be understood that variations and changes may be resorted to without departing from the spirit of my invention as defined by the appended claims.

What I claim is:

1. An improvement in a U-bolt type pipe clamp saddle for clamping a pipe joint, said pipe clamp saddle having a pair of spaced-apart sleeve portions and a web therebetween, said improvement comprising said web having a tubular strengthening rib therein; said pipe clamp saddle being formed from a single metal stamping having a transverse line of symmetry thereacross from which a pair of opposed allochiral halves extend and along which line said stamping is folded forming said web, said sleeves and said tubular strengthening rib; portions of said opposed allochiral halves being spot welded together in coextensive, facially contacting relation; said fold being along the bottom edge of said web; each sleeve extending substantially perpendicularly to the fold and adjacent an edge of said web, the cross section of said sleeves being hexagonal; said tubular strengthening rib being formed from matching deformations in said allochiral halves.

* * * * *